(12) United States Patent
Glauner et al.

(10) Patent No.: US 8,470,916 B2
(45) Date of Patent: Jun. 25, 2013

(54) HALOGEN-FREE FLAME RETARDANTS

(75) Inventors: Udo Glauner, Sindelfingen (DE); Uwe Storzer, Tuebingen (DE); Holger Keller, Reppenstedt (DE); Horst Rieckert, Calw (DE)

(73) Assignee: Schill + Seilacher AG (DE)

( * ) Notice: Subject to any disclaimer, the term of this patent is extended or adjusted under 35 U.S.C. 154(b) by 639 days.

(21) Appl. No.: 12/663,825

(22) PCT Filed: Mar. 2, 2009

(86) PCT No.: PCT/EP2009/001463
§ 371 (c)(1),
(2), (4) Date: Dec. 9, 2009

(87) PCT Pub. No.: WO2009/109347
PCT Pub. Date: Sep. 11, 2009

(65) Prior Publication Data
US 2010/0181696 A1   Jul. 22, 2010

(30) Foreign Application Priority Data
Mar. 6, 2008   (DE) .......................... 10 2008 012 806

(51) Int. Cl.
C07F 9/6574   (2006.01)
C08K 5/49   (2006.01)
D01D 5/08   (2006.01)
D01D 5/10   (2006.01)

(52) U.S. Cl.
USPC ............... 524/117; 264/172.17; 264/172.18; 264/211

(58) Field of Classification Search
None
See application file for complete search history.

(56) References Cited

U.S. PATENT DOCUMENTS

| 4,127,590 A | | 11/1978 | Endo et al. | 260/346.74 |
| 4,157,436 A | * | 6/1979 | Endo et al. | 528/167 |
| 4,280,951 A | * | 7/1981 | Saito et al. | 524/118 |
| 4,737,567 A | * | 4/1988 | Matsumoto et al. | 528/167 |
| 5,530,088 A | * | 6/1996 | Sheen et al. | 528/287 |
| 5,665,801 A | * | 9/1997 | Chang et al. | 524/125 |
| 5,847,184 A | * | 12/1998 | Kleiner | 558/73 |
| 6,245,880 B1 | * | 6/2001 | Takeuchi et al. | 528/287 |
| 6,255,371 B1 | * | 7/2001 | Schlosser et al. | 524/100 |
| 6,498,227 B1 | * | 12/2002 | Horie | 528/176 |
| 7,563,840 B2 | * | 7/2009 | Ye | 524/449 |
| 2005/0261461 A1 | * | 11/2005 | Maeda et al. | 528/272 |
| 2006/0074154 A1 | * | 4/2006 | Harashina et al. | 524/115 |
| 2006/0223921 A1 | | 10/2006 | Bauer et al. | |
| 2006/0247343 A1 | * | 11/2006 | Kishimoto et al. | 524/117 |
| 2006/0258824 A1 | * | 11/2006 | Oshima et al. | 525/533 |
| 2008/0300349 A1 | * | 12/2008 | Fuchikami et al. | 524/117 |

FOREIGN PATENT DOCUMENTS

| DE | 2 148 348 | 4/1973 |
| DE | 26 46 218 | 4/1977 |
| DE | 28 16 100 | 10/1978 |
| EP | 1 070 754 | 1/2001 |
| GB | 1 575 157 | 9/1980 |

OTHER PUBLICATIONS

International Preliminary Report on Patentability, dated Sep. 16, 2010, (5 pgs).
International Search Report, dated Jul. 6, 2009, (3 pgs).
Official Action and translation issued in German counterpart application, with translation (12 pgs.).
Japanese Office Action (w/translation) issued in corresponding application No. 2010-549047, dated Mar. 1, 2013 (7 pgs).

* cited by examiner

*Primary Examiner* — Jeffrey Wollschlager
(74) *Attorney, Agent, or Firm* — Hayes Soloway P.C.

(57) ABSTRACT

A halogen-free flame retardant obtainable by polycondensation of phosphoric monomers with esterifying monomers is provided. The phosphoric monomer is an adduct of 9,10-dihydro-9-oxa-10-phospha-phenanthrene-10-oxide (DOPO) and ring substituted DOPO derivatives to unsaturated carboxylic acids. Monovalent and polyvalent alcohols are used as esterifying monomers. The flame retardant has an average molecular weight of more than 20,000 and an average degree of polymerization $P_n$ of at least 55, and is preferably used for the production of polyamide fibers and polyester fibers by melt spinning.

21 Claims, No Drawings

HALOGEN-FREE FLAME RETARDANTS

BACKGROUND OF THE INVENTION

The invention relates to a halogen-free flame retardant and to a thermoplastic polymer composition, in particular a polymer composition on the basis of polyamides or polyesters, which is containing the halogen-free flame retardant. The thermoplastic polymer composition is particularly suitable for the production of polymer fibers in the melt spinning process.

For the production of flame retardant thermoplastic polymers, it is desirable for economic reasons to use nonreactive flame retardants since the latter can be introduced into a base polymer by a simple physical mixing or dissolution. In contracts thereto, the production of flame-retardant thermoplastic polymers using reactive flame retardants always requires at least one or more chemical process steps which are usually carried out already during the production of the base polymer.

For the production of flame-retardant thermoplastic polymers, it is desirable for economic reasons to use nonreactive flame retardants since the latter can be introduced into a base polymer by a simple physical mixing or dissolution. In contrast thereto, the production of flame-retardant thermoplastic polymers using reactive flame retardants always requires at least one or morel chemical process steps which are usually carried out already during the production of the base polymer.

Whereas nonreactive flame retardants allow a so-called "late addition" process in which the flame retardant is added to the base polymer only shortly before processing, usually during an extrusion process, it is normally not possible to use reactive flame retardants in a late addition process, since the latter react chemically with the base polymer and cause, in most causes, a polymer decomposition under the temperature and pressure conditions prevailing during extrusion.

For the production of polyamides finished to be flame-retarding, a large number of nonreactive flame retardants has already been in technical use for a long time. However, these are based in most cases on halogen- or antimony-containing substances which recently have come under public criticism due to their negative eco- and genotoxicological potential. For this reason, halogen- and antimony-free nonreactive flame retardants are increasingly used, such as, e.g., red phosphor, melamine polyphosphate, melamine cyanurate or aluminum phosphinates, as are described in EP-A 1 070 754, which in comparison with the substances containing halogen and antimony distinguish themselves by considerably better toxicological properties.

However, all aforementioned flame retardants are only partly suitable for use in melt spinning processes employed for the production of polyamide or polyester fibers. The halogenated flame retardants can considerably damage the spinning nozzles under the temperature and pressure conditions usual during spinning. In contrast thereto, melamine polyphosphate, melamine cyanurate or aluminum phosphinates are only insufficiently soluble in polyamides or polyesters which results in an inhomogeneous distribution of the flame retardant in the base polymer. This leads to considerable drawbacks in particular in the melt spinning process, since a clogging of the spinning nozzles is caused. In the case of red phosphor, merely intensively red dyed fiber products can be obtained, as known from document DE-A 21 48 348.

Document DE 26 46 218 A1 discloses phosphoric flame retardants which are obtained by addition reacting of 9,10-dihydro-9-oxa-10-phospha-phenanthrene-10-oxide (DOPO) to an unsaturated compound having at least one ester-forming functional group, and by a further reaction with an esterifying compound which is selected from dicarboxylic acids or esterifying derivatives thereof, diols or esterifying derivatives thereof, and oxycarboxylic acids or esterifying derivatives thereof. These phosphoric flame retardants are then reacted with dicarboxylic acids, such as terephthalic acid, and with a glycol so as to obtain flameproof polyesters.

Document DE 28 16 100 C2 discloses flame-retarding agents obtained by polycondensation of the addition product of DOPO or DOPO derivatives to itaconic acid with polyvalent alcohols, and having a molecular weight of from 1,000 to 20,000 g/mol and a phosphorous content of from 5.3 to 8.5% by weight.

SUMMARY OF THE INVENTION

It is the object of the invention to provide halogen-free flame retardants which are not toxic and which can be processed easily together with thermoplastic molding compositions at high temperatures in a melt spinning process or other extrusion processes.

According to the invention, this object is achieved by a halogen-free flame retardant obtainable by polycondensation of a phosphoric monomer with an esterifying monomer to form a phosphoric polyester, wherein the phosphoric monomer is selected from the group consisting of addition reaction products of 9,10-dihydro-9-oxa-10-phospha-phenantrene-10-oxide (DOPO) and ring-substituted DOPO derivatives to an unsaturated compound selected from the group of monovalent and polyvalent carboxylic acids and anhydrides thereof, and wherein the esterifying monomer is selected from the group consisting of monovalent and polyvalent alcohols and mixtures thereof, and monovalent and polyvalent carboxylic acids. The flame retardant according to the invention is characterized in that the polyester has an average molecular weight $M_n$ of more than 20,000 g/mol and an average degree of polymerization $P_n$ of at least 55.

DETAILED DESCRIPTION OF THE INVENTION

Surprisingly, it was found that the addition of phosphoric polyesters according to the invention to polyamide based molding compositions, such as, e.g., PA 6, PA 12 and PA 66, resulted in polymer compositions which are suitable for producing flame retardant polyamide fibers in the melt spinning process. Good results could also be obtained with polymer compositions on the basis of polyesters such as polyethylene terephthalate (PET). The flame retardants according to the invention are characterized by a high stability and a good solubility in thermoplastic base polymers and can therefore be distributed homogeneously in the base polymer by a simple physical mixing under conditions which are usual in a melt spinning, extrusion or injection molding process. Furthermore, due to the high molecular weight, the flame retardants according to the invention have only a very low tendency to migrate out of the base polymer and thus produce a permanent flame-retarding effect. At the same time, the flame retardants according to the invention do not have a negative influence on the physical properties of the base polymer so that a reliable processing during the melt spinning process or the following process steps, such as stretching, texturing and dyeing, is ensured.

The phosphoric polyester according to the invention used as a flame retardant preferably has a dynamic viscosity of 200 Pas, preferably of between 750 and 1250 Pas, at a temperature of 120° C. In this viscosity range, an optimum processability of the polyester in the melt spinning process and other extrusion processes at a high temperature is ensured. The desired viscosity can be adjusted by an accurate monitoring of the average molecular weight $M_n$, the average degree of polymerization $P_n$ and/or the degree of cross-linking of the polyester.

Furthermore, the phosphoric polyester according to the invention preferably has a softening point of between 100° C. and 130° C. Such polyesters can be easily adapted to the use with polyamides which have similar physical properties.

The phosphoric monomer used to produce the flame retardant according to the invention is an adduct of DOPO or a ring-substituted DOPO derivative to an unsaturated monovalent or polyvalent carboxylic acid or an anhydride thereof and preferably comprises a compound represented by the following general formula (I):

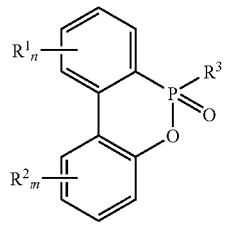

(I)

wherein $R^1$ and $R^2$ are identical or different and denote, each independently of each other, alkyl, alkoxy, aryl, aryloxy or aralkyl; n and m are integers of from 0 to 4; and $R^3$ denotes a residue derived from an unsaturated dicarboxylic acid or an anhydride thereof. Preferably, $R^1$ and $R^2$ are each $C_{1-8}$ alkyl or $C_{1-8}$ alkoxy, and n and m are 0 or 1.

Preferred unsaturated mono- or dicarboxylic acids for the reaction with DOPO are sorbic acid, acrylic acid and crotonic acid, and itaconic acid, maleic acid, fumaric acid, endomethylene tetrahydrophthalic acid, citraconic acid, mesaconic acid and tetrahydrophthalic acid and the anhydrides thereof. Itaconic acid, maleic acid and the anhydrides thereof are particularly preferred.

The esterifying monomer used to produce the polyester flame retardant according to the invention is preferably selected from the group consisting of saturated monovalent and polyvalent alcohols. Particularly preferred esterifying monomers are aliphatic diols such as monoethylene glycol, diethylene glycol, propylene glycol, 1,3-propanediol, 1,3-butanediol, 1,4-butanediol, neopentyl glycol, hexanediol and 1,10-decanediol. Preferred polyvalent alcohols are tris-2-hydroxyethyl isocyanurate (THEIC), glycerol, trimethylolethane, trimethylolpropane and pentaerythrite, and sugar alcohols such as mannitol.

To improve the compatibility with the thermoplastic polymers, the polyester according to the invention can be end-capped by reaction with a monovalent alcohol or an optionally phosphoric monocarboxylic acid.

The phosphorous content of the flame retardant according to the invention can be adjusted almost infinitely and preferably amounts to between about 5 and 8.5% by weight, particularly preferably between about 7.5 and about 8.5% by weight.

The average molecular weight $M_n$ of the phosphoric polyester according to the invention preferably amounts to more than about 25,000 g/mol and preferably to between about 25,000 and about 100,000 g/mol, in particular between about 25,000 and 35,000 g/mol. The average degree of polymerization of the polyester amounts to at least 50 and preferably to between about 60 and 250, particularly between about 60 and 90. The polyesters which are high-molecular in comparison with the prior art are particularly stable in the polymer melt since reesterification reactions are largely suppressed.

A particularly preferred embodiment of the flame retardant according to the invention contains polyester chains represented by the following general formula (II):

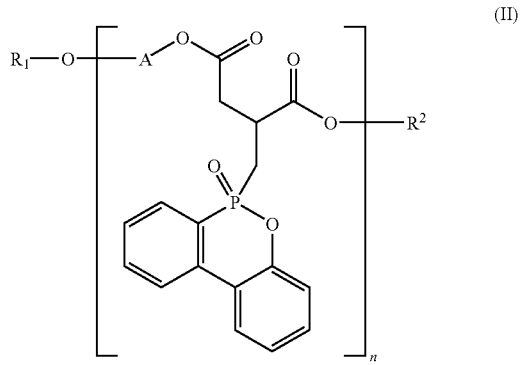

(II)

wherein $R^1$ denotes hydrogen, methyl or ethyl; $R^2$ denotes a residue $-(CH_2)_m-O-R^1$; A is a branched or unbranched alkylene group having 2 to 6 carbon atoms or an optionally substituted aromatic bridging group; and n is an integer between 55 and 110. The substituents at the aromatic bridging group are preferably alkyl, alkoxy, aryl, aryloxy, aralkyl and alkylaryl.

The flame retardant according to the invention represented by the formula (II) is preferably a polyester having phosphorous contents of between 7.5% by weight and 8.5% by weight. The polyester is easily available by a polycondensation of compounds represented by the following general formula (III):

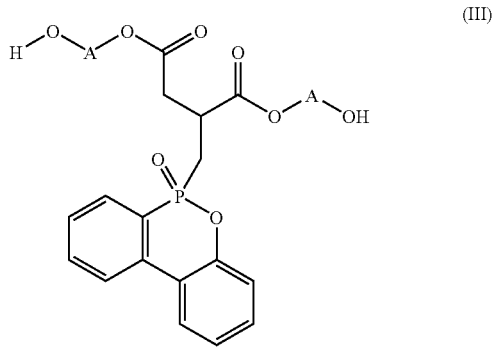

(III)

In the above formula (III), A has the meaning specified above.

In a particularly preferred embodiment, the residues in the above formula (II) have the following meanings: $R^1$=H, $R^2$=$CH_2CH_2OH$ and A=$CH_2CH_2$. In this case, the polyester has a phosphorous content of from 7.9 to 8.4% by weight, an average molecular weight $M_n$ of from 25,000 to 100,000 g/mol (from the terminal group assay) for an average degree of polymerization Pn of between 55 and 250, and softening points of between 100° C. and 130° C. The dynamic viscosity of the polyester at a temperature of 120° C. amounts to between 700 and 1300 Pas.

In addition to the higher temperatures and the prolonged polycondensation times which are necessary for the production of the polyester according to the invention, as compared to the standard polyester production conditions, it is also possible to use the additives known to a person skilled in the art for chain prolongation and chain cross-linking, optionally in combination with heat stabilizers and/or monofunctional alcohols or carboxylic acids for chain end-capping. To improve the color of the flame retardant according to the invention, it is further possible to use known optical brightening agents. The polyester chains of the flame retardant according to the invention are preferably partly cross-linked, i.e. part of the polyester chains are connected to each other by co-condensation in the presence of a polyvalent alcohol.

According to the invention, the flame retardants described above are used to produce flame retardant polymer fibers in a melt spinning process, wherein the polymer fibers are selected from the group of polyamide fibers and polyester fibers. For this purpose, the flame retardants are physically mixed with the appropriate polyamide or polyester in the melt, and the mixture is then either directly spun as a polymer mixture having a phosphorous content of between 0.1% by weight and 2% by weight so as to form filaments, or, the mixture is then tailored in terms of a master batch having a phosphorous content of between 2% by weight and 5% by weight, and is then added to the same or a different type of polyamide or polyester and spun to filaments in a second process step.

Due to the excellent chemical stability of the flame retardants according to the invention, they can also be used in other thermoplastic molding compositions such as so-called "engineering polymers" which are usually processed at a high temperature by extrusion or injection molding processes.

A further aspect of the invention therefore relates to a thermoplastic polymer composition comprising a thermoplastic polymer selected from the group consisting of polyesters, polyimides, polysulfones, polyolefins such as polyethylene and polypropylene, polyacrylates, polyetheretherketones, ABS, polyurethanes, polystyrenes, polycarbonates, polyphenylene oxides, unsaturated polyester resins, phenolic resins and polyamides, and comprising a halogen-free flame retardant according to the present invention, the total phosphorous content of the polymer composition amounting to between about 0.1 and 5% by weight.

The thermoplastic polymer is preferably a polyamide that is suitable for melt spinning, in particular a polyamide which is selected from the group consisting of PA 6, PA 66 and PA 12.

In another preferred embodiment, the thermoplastic polymer is polyester which is suitable for melt spinning, such as polyethylene terephthalate.

The invention further relates to a method of producing flame retardant polyamide fibers, comprising the steps of melting and extruding a polymer composition so as to form filaments, the polymer composition containing a polyamide which is suitable for melt spinning and the flame retardant according to the invention. The polymer composition can be added as a master batch having a phosphorous content of 2 to 5% by weight to a polyamide molding composition which is suitable for melt spinning, and the polyamide of the polymer composition and the polyamide of the polyamide molding composition can be identical or different. According to another preferred embodiment. It is possible in the same manner to produce, also in a master batch process, flame retardant polyester fibers from a polymer composition comprising a polyester that is suitable for melt spinning and the flame retardant according to the invention.

The polymer fibers produced in the melt spinning process preferably have a total phosphorous content of from 0.1 to 2% by weight, in particular of from 0.5 to 1% by weight, and they are therefore sufficiently flameproof.

All aforementioned polyamides and polyesters can be finished in an excellent manner to be flame-retarding with the aforementioned flame retardants by a simple physical mixing of the polymer melts under conditions as are usual in the melt spinning process. When using the phosphoric polyester according to the invention as a nonreactive flame retardant, important polymer properties such as the melt viscosity, the melting point and the melt volume-flow rate of the polymer composition obtained after mixing are changed only to an extent that a reliable processing such as a melt spinning remains entirely ensured.

Therefore, the invention also relates to the use of a halogen-free flame retardant according to the invention in the production of thermoplastic molding compositions, the molding compositions being adapted to be processed at temperatures above 120° C. so as to obtain flameproof molding pieces. The invention particularly provides that the molding pieces are flame-retardant polyamide fibers and flame-retardant polyester fibers produced in a melt spinning process.

For specific cases of application, it is also possible to use other known flame retardants, in terms of synergists, in combination with the flame retardant according to the invention, such as, e.g., melamine cyanurate, melamine polyphosphate, ammonium polyphosphate and metal stannates, preferably zinc stannate. Due to the use of these synergists, parameters that are important to the flame-retarding properties can be modified, for example the characteristic cone calorimetric numbers TTI (time to ignition) can be increased, PHRR (peak of heat release rate) can be reduced and/or a desired suppression of the smoke gas generation can be improved. Examples for further synergists are metal borates such as zinc borate, polyhedral oligomeric silsesquioxanes (for example trade name POSS® of Hybrid Plastics), and the so-called nanoclays based on the exfoliated phyllosilicates montmorillonite and bentonite, such as, e.g., the products Nanomer® of Nanocor, or Nanofil® of Südchemie, and inorganic metal hydroxides such as the products Magnifin® or Martinal® of Martinswerk. In the polymer composition, the synergists are present in a proportion of from 0.5 up to 50% by weight with respect to the weight of the flame retardant according to the invention.

Further advantages of the invention will be apparent from the following description of preferred embodiments which however are not to be taken in a limiting sense.

Production of a Phosphoric Polyester According to the Invention

Example 1

346.3 g (1 mol) of 2-[(6-oxido-6H-dibenzo[c,e][1,2]oxaphosphinine-6-yl)methyl]succinic acid recrystallized twice from propionic acid and represented by the following formula:

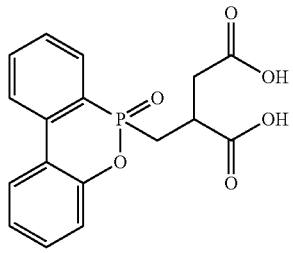 [SMILES: O=C(O)CC(CP1(=O)Oc2ccccc2-c2ccccc21)C(=O)O]

are refluxed for two hours together with 186.21 g (3 mol) monoethylene glycol (MEG) in a one-liter three-necked flask equipped with a precision glass stirrer, a 20 cm Vigreux column, a distilling connecting tube and an internal thermometer, and the reaction water thereby produced is continuously removed by distillation. The column is then removed, and the pressure is reduced to 20 mbar to remove excess MEG by distillation. After aeration with $N_2$, 30 mg $GeO_2$ dissolved in 10 ml MEG and 380 mg trimethylolpropane are stirred in for 15 minutes, and the pressure is then reduced to 0.5 mbar, the temperature being increased to 260° C. The mixture is then stirred under these conditions for 240 minutes. After cooling, a pale yellow glassy polymer is obtained which contains polyester chains represented by the following formula:

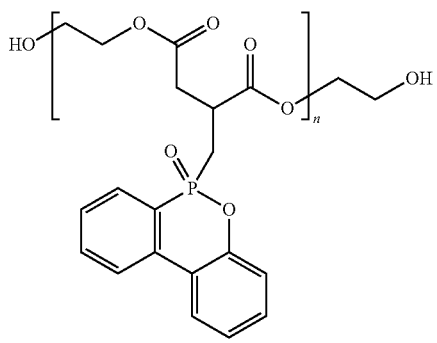

wherein n denotes the mole fraction of the polyester repeating unit and the polyester chains have an average degree of polymerization $P_n$ of approximately 80. The polymer thus obtained has the following analytical data:

| | |
|---|---|
| Average molar weight (terminal group assay) $M_n$ | 28.500 |
| Phosphorous content [%] | 8.2 |
| COOH terminal groups | 40 µval/g |
| OH terminal groups | 30 µval/g |
| Softening point (Cup and Ball) | 123° C. |
| Glass-transition temperature (DSC) | 74° C. |
| Dynamic viscosity at 120° C., 5 $sec^{-1}$ (Plate - Cone) | 800 Pas |

Production of Flame Retardant Polyamide Fibers

Example 2-1

The phosphoric polyester produced in Example 1 is milled in a ball mill, and the powder is then dried at 55° C. in a drying cabinet for 24 hours until it has a proportion of water of 5 ppm. The colorless powder is then mixed with polyamide 6 chips having a relative viscosity of 2.7 (measured at 25° C. as 1%-solution in $H_2SO_4$), and extruded at a ratio of 5:95 mass fractions (polyester: PA6) in accordance with the parameters usual for PA 6, and is spun to filaments.

Example 2-2

As described in Example 2-1, the polyester according to the invention is extruded in accordance with the parameters usual for PA 6 on a polyamide-filament-machine together with polyamide 6 chips having a relative viscosity of 2.7 (measured at 25° C. as 1%-solution in $H_2SO_4$) at a ratio of 10:90 mass fractions, and is spun to filaments.

Testing of Textile-Mechanical Properties

Example 3

The filament yarns produced according to Examples 2-1 and 2-2 (spool 1 and spool 2) are stretched using known methods, and the textile-mechanical properties are examined. For comparison, a pure filament yarn (spool 0) without flame retardant is produced from the polyamide 6 chips specified above and under the same conditions, and it is also stretched. The results obtained from the textile-mechanical examination in the stress-strain-diagram are given below.

| | unstretched | | | |
|---|---|---|---|---|
| spool | strain [%] | fineness [dtex] | stress [cN/tex] | module [cN/tex] |
| 0 | 292.3 | 220 | 16.58 | 50.21 |
| 1 | 284.6 | 220 | 15.96 | 51.55 |
| 2 | 272.4 | 218 | 14.65 | 64.96 |

| | stretched | | | |
|---|---|---|---|---|
| spool | strain [%] | fineness [dtex] | stress [cN/tex] | module [cN/tex] |
| 0 | 25.1 | 72 | 50.26 | 372.89 |
| 1 | 24.3 | 71.8 | 50.14 | 374.65 |
| 2 | 15.87 | 72 | 49.3 | 403.53 |

Flame-Retardancy Test

Example 4

The stretched filament yarns of Example 3 are each knitted to stockings. The Limiting Oxygen Index (LOI) is measured at each of the two flame-retarding knitted stockings and for comparison also at the unfinished polyamide 6 knitted stocking (spool 0). The LOI indicates up to which oxygen content in the ambient atmosphere a combustion of the examined sample is maintained. An LOI of 20.9% means for example that a sample is only just burning at standard atmosphere but stops burning at a lower $O_2$ proportion. The LOI test leads to the following results:

| spool | proportion of the flame retardant [% by weight] | phosphorous content [%] | LOI [% $O_2$] |
|---|---|---|---|
| 0 | 0 | 0 | 23.5 |
| 1 | 5 | 0.4 | 34.5 |
| 2 | 10 | 0.8 | 38.5 |

Polyester According to Document DE 28 16 100

Comparative Example 5

346.3 g (1 mol) of 2-[(6-oxido-6H-dibenzo[c,e][1,2]oxaphosphinine-6-yl)methyl]succinic acid recrystallized twice from propionic acid are refluxed for two hours together with 186.21 g (3 mol) monoethylene glycol (MEG) in a one-liter three-necked flask equipped with a precision glass stirrer, a 20 cm Vigreux column, a distilling connecting tube and an internal thermometer, and the reaction water thereby produced is continuously removed by distillation. The column is then removed, and the pressure is reduced to 20 mbar to remove excess MEG by distillation. After the aeration with $N_2$, 30 mg $GeO_2$ dissolved in 10 ml MEG are stirred in for 15 minutes, and the pressure is then reduced to 0.5 mbar, the temperature being increased to 250° C. The mixture is then stirred under these conditions for 90 minutes. After cooling, a pale yellow glassy polymer is obtained which has the following analytical data:

| | |
|---|---|
| Average molar weight (terminal group assay) $M_n$ | 5000 |
| Phosphorous content [%] | 8.0 |
| COOH terminal groups | 78 µval/g |
| OH terminal groups | 321 µval/g |
| Softening point (Cup and Ball) | 62° C. |
| Glass-transition temperature (DSC) | 57° C. |
| Dynamic viscosity at 120° C., 5 sec$^{-1}$ (Plate - Cone) | 25 Pas |

Production of Polyamide Fibers

Comparative Example 6

The polyester of Comparative example 5 is treated in accordance with Example 2-1 and extruded together with polyamide 6 chips having a relative viscosity of 2.7 (measured at 25° C. as 1%-solution in $H_2SO_4$) at a ratio of 10:90 mass fractions (polyester: polyamide) on a polyamide-filament-machine and in accordance with the parameters usual for PA 6. A reliable spinnability to filaments is not provided due to the considerably increased number of yarn breaks. The LOI test of the knitted stocking produced from this filament leads to the following results:

| spool | proportion of the flame retardant [% by weight] | phosphorous content [%] | LOI [% $O_2$] |
|---|---|---|---|
| 1 | 10 | 0.8 | 28.1 |

Comparative Example 7

The free 2-[(6-oxido-6H-dibenzo[c,e][1,2]oxaphosphinine-6-yl)methyl]succinic acid is extruded together with polyamide 6 chips having a relative viscosity of 2.7 (measured at 25° C. as 1%-solution in $H_2SO_4$) at a ratio of 10:90 mass fractions on a polyamide-filament-machine and in accordance with the parameters usual for PA 6. The resulting polymer has obtained a clearly yellowish color and is very brittle, whereby a reliable spinnability to filaments is not provided due to the considerably increased number of yarn breaks.

Flameproof Polyamide Fibers from Master Batch

Example 8

The flame retardant produced according to Example 1 is milled in a ball mill to form a powder and dried, and is then extruded together with polyamide 6 chips having a relative viscosity of 2.7, as measured at 25° C. as 1%-solution in $H_2SO_4$, and at a ratio of 25:75 mass fractions on a twin-screw extruder so as to form a strand, which is then granulated to chips having a phosphorous content of 2%. After drying these chips to a water content of <25 ppm, they are mixed and spun with polyamide 6 chips having a relative viscosity of 2.7 (measured at 25° C. as 1%-solution in $H_2SO_4$) at a ratio of 20:80 and 40:60 mass fractions and under the aforementioned conditions. The processing is effected without difficulty, and after the stretching of the polyamide fibers, the following textile-mechanical values are obtained. Knitted stockings are produced from the filaments yarns as described in Example 4, and LOI-measurements are carried out which are also specified in the following table:

| spool | strain [%] | fineness [dtex] | stress [cN/tex] | module [cN/tex] | phosphorous content [%] | LOI [% $O_2$] |
|---|---|---|---|---|---|---|
| 1 | 23.35 | 72 | 49.25 | 376.37 | 0.4 | 35.5 |
| 2 | 16.28 | 72 | 49.0 | 398.48 | 0.8 | 38.5 |

Production of a Further Phosphorous Polyester

Example 9

346.3 g (1 mol) of 2-[(6-oxido-6H-dibenzo[c,e][1,2]oxaphosphinine-6-yl)methyl]succinic acid recrystallized twice from propionic acid are refluxed for two hours together with 228.87 g (3 mol) 1,3-propanediol in a one-liter three-necked flask equipped with a precision glass stirrer, a 20 cm Vigreux column, a distilling connecting tube and an internal thermometer, and the reaction water thereby produced is continuously removed by distillation. The column is then removed, and the pressure is reduced to 20 mbar to remove excess 1,3-propanediol by distillation. After aeration with $N_2$, 80 mg titanium tetrabutylate dissolved in 10 ml 1,3-propanediol and 380 mg trimethylolpropane are stirred in for 15 minutes, and the pressure is then reduced to 0.5 mbar, the temperature being increased to 250° C. The mixture is then stirred under these conditions for 240 minutes. After cooling, a pale yellow glassy polymer is obtained which has polyester chains represented by the following formula:

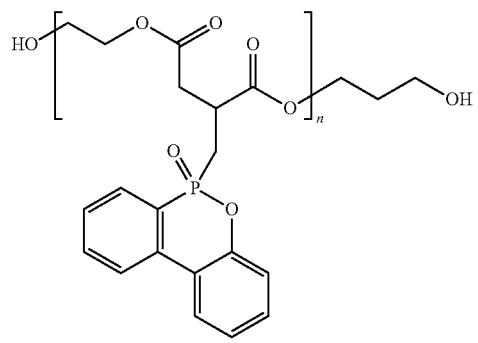

and which has an average degree of polymerization $P_n$ of approximately 71 and shows the following analytical data:

| | |
|---|---|
| Average molar weight (terminal group assay) $M_n$ | 27500 |
| Phosphorous content [%] | 7.7 |
| COOH terminal groups | 41 µval/g |
| OH terminal groups | 32 µval/g |
| Softening point (Cup and Ball) | 115° C. |
| Glass-transition temperature (DSC) | 72° C. |
| Dynamic viscosity at 120° C., 5 sec$^{-1}$ (Plate - Cone) | 790 Pas |

Textile-Technical Testing and Flame Retardancy Test

Example 10

The polyester produced according to Example 9 is treated in accordance with Example 2-1, is then mixed with polyamide 6 chips having a relative viscosity of 2.7 (measured at 25° C. as 1%-solution in $H_2SO_4$) and then spun at a ratio of 5:95 and 10:90 mass fractions (polyester: polyamide) on a polyamide-filament-machine to form flameproof polyamide fibers.

After stretching of the polyamide fibers, the textile-mechanical values specified in the following table are obtained. Knitted stockings are produced from the filament yarns as described in Example 4, and LOI measurements are carried out. The values obtained by this test are also specified in the table.

| Spool | strain [%] | fineness [dtex] | stress [cN/tex] | module [cN/tex] | phosphorous content [%] | LOI [% $O_2$] |
|---|---|---|---|---|---|---|
| 1 | 25.27 | 72 | 50.26 | 368.20 | 0.4 | 34.5 |
| 2 | 17.3 | 72 | 49.67 | 395.09 | 0.8 | 39.5 |

Production of Flame Retardant Polyethylene Terephthalate Filament Yarns

Example 11

The phosphoric polyester produced in Example 1 is milled in a ball mill, and the powder is then dried at 55° C. in a drying cabinet for 24 hours until it has a proportion of water of 25 ppm. The colorless powder is then mixed with PET granulate (trade name RT51 of Invista Resins&Fibers) having an intrinsic viscosity of 0.63 (measured at 25° C. as 1%-solution in dichloroacetic acid), and is then extruded at a ratio of 7.5:92.5 mass fractions (P-containing polyester:PET) in accordance with the parameters usual for PET, and is spun to filaments.

Testing of Textile-Mechanical Properties

Example 12

The filament yarns produced according to Example 11 (spool 1) are stretched using known methods, and the textile-mechanical properties are examined. For comparison, a pure filament yarn (spool 0) without flame retardant is produced from the PET granulate specified above and under the same conditions, and it is also stretched. The results obtained from the textile-mechanical examination in the stress-strain-diagram are given below.

| | unstretched | | | |
|---|---|---|---|---|
| spool | strain [%] | fineness [dtex] | stress [cN/tex] | module [cN/tex] |
| 0 | 94.38 | 98.4 | 22.92 | 314.92 |
| 1 | 110.72 | 92 | 20.49 | 250.76 |

| | stretched | | | |
|---|---|---|---|---|
| spool | strain [%] | fineness [dtex] | stress [cN/tex] | module [cN/tex] |
| 0 | 25.57 | 33.55 | 60 | 710.88 |
| 1 | 32.65 | 59.5 | 31.85 | 733.22 |

Flame-Retardancy Test

Example 13

The stretched filament yarns of Example 12 are each folded three times and knitted to stockings. The Limiting Oxygen Index (LOI) is measured both at the flame-retarding knitted stocking and for comparison also at the PET knitted stocking which is not finished so as to be flame retardant (spool 0). The measurement of the LOI results in the following values:

| spool | proportion of the flame retardant [% by weight] | phosphorous content [%] | LOI [% $O_2$] |
|---|---|---|---|
| 0 | 0 | 0 | 23.5 |
| 1 | 7.5 | 0.6 | 30.5 |

Polyester Filaments Comprising Flame Retardant Produced According to Document DE 28 16 100

Comparative Example 14

The phosphoric polyester of Comparative example 5 is treated according to Example 11 and extruded together with PET granulate (trade name RT51 of Invista Resins&Fibers) having an relative viscosity of 0.63 (measured at 25° C. as 1%-solution in dichloroacetic acid) at a ratio of 7.5:92.5 mass fractions (flame retardant: PET) on a polyester-filament-machine and in accordance with the parameters usual for PET. Due to the considerably increased number of yarn breaks of the resulting very brittle filaments, a reliable spinning so as to obtain filament yarn spools is not possible.

The invention claimed is:

1. A thermoplastic polymer composition suitable for melt pinning comprising a thermoplastic polymer selected from the group consisting of a polyester, a polysulfone, a polyimide and a polyamide, a polyolefin, a polyacrylate, a polyetheretherketone, ABS, a polyurethane, a polystyrene, a polycarbonate, a polyphenylene oxide, an unsaturated polyester resin, a phenolic resin, and a halogen-free flame retardant, wherein the polymer composition has a total phosphorous content of between about 0.1 and 5% by weight, wherein the halogen-free flame retardant is a phosphoric polyester formed by polycondensation of a phosphoric monomer with an esterifying monomer, wherein the phosphoric monomer is an addition reaction product of at least one of 9,10-dihydro-9-oxa-10-phospha-phenanthrene-10-oxide (DOPO) and a ring-substituted DOPO derivative to unsaturated compounds selected from the group of a monovalent and a polyvalent carboxylic acid and an anhydride thereof, and wherein the esterifying monomer is selected from the group consisting of a monovalent alcohol, a polyvalent alcohol and a mixture thereof, wherein the phosphoric polyester has an average molecular weight Mn of more than 20,000 and an average degree of polymerization Pn of at least 55.

2. The polymer composition according to claim 1, wherein the phosphoric polyester has a dynamic viscosity at 120° C. of least 200 Pas.

3. The polymer composition according to claim 2, wherein the polyester has a dynamic viscosity at 120° C. of between 750 and 1250 Pas.

4. The polymer composition according to claim 1, wherein the phosphoric polyester has a softening point of between 100° C. and 130° C.

5. The polymer composition according to claim 1, wherein the phosphoric monomer comprises a compound represented by the following general formula (I):

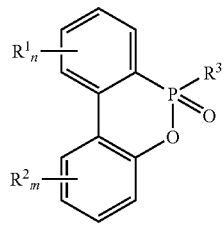

(I)

wherein $R^1$ and $R^2$ are identical or different and denote, each independently of each other, alkyl, alkoxy, aryl, aryloxy or aralkyl; n and m are integers of from 0 to 4; and $R^3$ constitutes a residue derived from an unsaturated dicarboxylic acid or an anhydride thereof.

6. The polymer composition according to claim 1, wherein the phosphoric polyester is end-capped by reaction with a monovalent alcohol or a monocarboxylic acid.

7. The polymer composition according to claim 1, wherein the phosphoric polyester has a phosphorous content of between about 5 and 8.5% by weight.

8. The polymer composition according to claim 1, wherein the phosphoric polyester has an average molecular weight Mn of more than about 25,000.

9. The polymer composition according to claim 8, wherein the average molecular weight Mn is between about 25,000 and 100,000 g/mol.

10. The polymer composition according to claim 8, wherein the average molecular weight Mn is about 35,000 g/mol.

11. The polymer composition according to claim 1, wherein the thermoplastic polymer is a polyamide that is suitable for melt spinning.

12. The polymer composition according to claim 11, wherein the polyamide is selected from the group consisting of PA 6, PA 66 and PA 12.

13. The polymer composition according to claim 1, wherein the thermoplastic polymer is a polyester which is suitable for melt spinning.

14. The polymer composition according to claim 13, wherein the polyester comprises polyethylene terephthalate.

15. A method of producing polymer fibers comprising the steps of heating and extruding a polymer composition as claimed in claim 1 to form filaments, the polymer being selected from the group consisting of a polyamide and a polyester which are suitable for melt spinning.

16. The method according to claim 15, wherein the polymer is a polyamide, and the polymer composition is added as a master batch having a phosphorous content of from 2 to 5% by weight to a polyamide molding composition which is suitable for melt spinning.

17. The method according to claim 16, wherein the polyamide of the polymer composition and the polyamide of the polyamide molding composition are identical or different.

18. The method according to claim 15, wherein the polymer is a polyester and in that the polymer composition is added as a master batch having a phosphorous content of from 2 to 5% by weight to a polyester molding composition which is suitable for melt spinning.

19. The method according to any of claim 15, wherein the polymer fibers have a total phosphorous content of from 0.1 to 2% by weight.

20. The method according to claim 19, wherein the total phosphorous content of the polymer fibers is from 0.5 to 1% by weight.

21. The method of claim 15, wherein the polymer composition is heated to a temperature of more than 120° C.

* * * * *

UNITED STATES PATENT AND TRADEMARK OFFICE
CERTIFICATE OF CORRECTION

PATENT NO.       : 8,470,916 B2                                    Page 1 of 1
APPLICATION NO.  : 12/663825
DATED            : June 25, 2013
INVENTOR(S)      : Glauner et al.

It is certified that error appears in the above-identified patent and that said Letters Patent is hereby corrected as shown below:

In the Claims

Claim 1, Col. 12, line 47, "pinning" should be --spinning--.

Signed and Sealed this
Nineteenth Day of August, 2014

Michelle K. Lee
*Deputy Director of the United States Patent and Trademark Office*